United States Patent
Sheynblat

(10) Patent No.: US 10,678,502 B2
(45) Date of Patent: Jun. 9, 2020

(54) SYSTEMS AND METHODS FOR IN-EAR CONTROL OF REMOTE DEVICES

(71) Applicant: QUALCOMM Incorporated, San Diego, CA (US)

(72) Inventor: Leonid Sheynblat, Hillsborough, CA (US)

(73) Assignee: Qualcomm Incorporated, San Diego, CA (US)

(*) Notice: Subject to any disclaimer, the term of this patent is extended or adjusted under 35 U.S.C. 154(b) by 61 days.

(21) Appl. No.: 15/703,709

(22) Filed: Sep. 13, 2017

(65) Prior Publication Data
US 2018/0113673 A1 Apr. 26, 2018

Related U.S. Application Data

(60) Provisional application No. 62/410,740, filed on Oct. 20, 2016.

(51) Int. Cl.
*G06F 3/16* (2006.01)
*H04R 1/10* (2006.01)
(Continued)

(52) U.S. Cl.
CPC .............. *G06F 3/167* (2013.01); *G10L 17/00* (2013.01); *G10L 17/005* (2013.01);
(Continued)

(58) Field of Classification Search
CPC ....... G06F 3/167; G10L 17/00; G10L 17/005; G10L 17/24; G10L 17/26; G10L 15/22;
(Continued)

(56) References Cited

U.S. PATENT DOCUMENTS 7,480,387 B2* 1/2009 Meyer .................. H04R 25/652
  381/322
9,226,101 B1 12/2015 Ludwig et al.
(Continued)

FOREIGN PATENT DOCUMENTS

WO 2016069866 A2 5/2016

OTHER PUBLICATIONS

International Search Report and Written Opinion—PCT/US2017/051499—ISA/EPO—dated Dec. 20, 2017.
(Continued)

*Primary Examiner* — Fan S Tsang
*Assistant Examiner* — Angelica M McKinney
(74) *Attorney, Agent, or Firm* — Kilpatrick Townsend & Stockton

(57) ABSTRACT

Methods, systems, computer-readable media, and apparatuses for systems and methods for in-ear control of remote devices are presented. One disclosed method includes receiving, by a microphone of an in-ear device, audio signals from an audio source, the in-ear device inserted into a wearer's ear; determining a command based on the audio signals using a speech recognition technique; performing a voice recognition technique to determine an identity of the audio source; authenticating the command based on the identity of the audio source; and transmitting a signal to a remote electronic device, the signal configured to cause the remote electronic device to execute the command.

29 Claims, 9 Drawing Sheets

(51) Int. Cl.
*G10L 17/00* (2013.01)
*H04R 1/46* (2006.01)
*H04R 25/00* (2006.01)
*G10L 17/24* (2013.01)
*G10L 25/78* (2013.01)
*G10L 15/22* (2006.01)

(52) U.S. Cl.
CPC ......... *H04R 1/1008* (2013.01); *H04R 1/1016* (2013.01); *H04R 1/46* (2013.01); *G10L 15/22* (2013.01); *G10L 17/24* (2013.01); *G10L 25/78* (2013.01); *H04R 1/1083* (2013.01); *H04R 25/55* (2013.01); *H04R 2225/55* (2013.01); *H04R 2420/07* (2013.01); *H04R 2460/13* (2013.01)

(58) Field of Classification Search
CPC ..... G10L 15/78; H04R 1/1008; H04R 1/1016; H04R 2225/55; H04R 25/55; G07C 9/00071
See application file for complete search history.

(56) References Cited

U.S. PATENT DOCUMENTS

| | | | |
|---|---|---|---|
| 9,374,448 B2* | 6/2016 | Miller | H04M 1/6041 |
| 2006/0252470 A1 | 11/2006 | Seshadri et al. | |
| 2007/0030990 A1* | 2/2007 | Fischer | H04R 25/407 381/318 |
| 2009/0074220 A1* | 3/2009 | Shennib | H04R 25/02 381/325 |
| 2010/0217099 A1 | 8/2010 | Leboeuf et al. | |
| 2011/0019851 A1* | 1/2011 | Michel | H04R 25/456 381/326 |
| 2011/0217950 A1 | 9/2011 | Kozlay | |
| 2012/0008808 A1* | 1/2012 | Saltykov | H04R 25/48 381/317 |
| 2013/0339850 A1 | 12/2013 | Hardi et al. | |
| 2013/0343584 A1* | 12/2013 | Bennett | H04R 25/554 381/315 |
| 2014/0029777 A1 | 1/2014 | Jang | |
| 2014/0376703 A1 | 12/2014 | Timem et al. | |
| 2015/0168996 A1 | 6/2015 | Sharpe et al. | |
| 2015/0310444 A1 | 10/2015 | Chen et al. | |
| 2017/0092269 A1* | 3/2017 | Haubrich | G10L 15/22 |
| 2017/0171679 A1* | 6/2017 | Isberg | G06F 3/162 |

OTHER PUBLICATIONS

Kurcan R.S., "Isolated Word Recognition from in-ear Microphone Data using Hidden Markov Models (HMM)", Calhoun: The NPS Institutional Archive, Mar. 2006, pp. 1-179.

* cited by examiner

SYSTEMS AND METHODS FOR IN-EAR CONTROL OF REMOTE DEVICES

CROSS-REFERENCE TO RELATED APPLICATIONS

This application claims the benefit of U.S. Provisional Application No. 62/410,740, filed Oct. 20, 2016, entitled "Systems and Methods for In-Ear Control of Remote Devices" which is incorporated herein by reference.

BACKGROUND

In-ear devices are currently used as headphones for listening to music, making phone calls and as assistive devices for those with partial hearing loss. Such in-ear devices fit snugly within the ear, creating a seal between the ear canal and the external environment. They also include a speaker to output audio into the wearer's ear canal. By sealing the ear canal, these devices are able to filter environmental sounds while providing the desired audio, such as music and voice, to the wearer.

BRIEF SUMMARY

Various examples are described for systems and methods for in-ear control of remote devices. One example method includes receiving, by a microphone of an in-ear device, audio signals from an audio source, the in-ear device inserted into a wearer's ear; determining a command based on the audio signals using a speech recognition technique; performing a voice recognition technique to determine an identity of the audio source; authenticating the command based on the identity of the audio source; and transmitting a signal to a remote electronic device, the signal configured to cause the remote electronic device to execute the command.

One example in-ear device includes a housing sized to be inserted into a wearer's ear canal; a plurality of projections extending from an outer surface of the housing, each of the projections configured to engage with the wearer's ear canal to hold the housing within the wearer's ear canal; a first microphone disposed within the housing; a non-transitory computer-readable medium; a wireless transceiver; and a processor in communication with the non-transitory computer-readable medium, the wireless transceiver, and the first and second microphones, the processor configured to execute processor-executable instructions stored in the non-transitory computer-readable medium configured to cause the processor to: receive, from the microphone, audio signals from an audio source; determine a command based on the audio signals using a speech recognition technique; perform a voice recognition technique to determine an identity of the audio source; authenticate the command based on the identity of the audio source; and transmit, using the wireless transceiver, a signal to a remote electronic device, the signal configured to cause the remote electronic device to execute the command.

Another disclosed in-ear device includes housing means for inserting into a wearer's ear canal; means for engaging with the wearer's ear canal to hold the housing means within the wearer's ear canal; means for receiving audio signals; means for determining a command based on the audio signals; means for voice recognition to determine an identity of the audio source; means for authenticating the command based on the identity of the audio source; means for generating a signal configured to cause a remote electronic device to execute the command; and means for transmitting the signal to the remote electronic device.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1A:
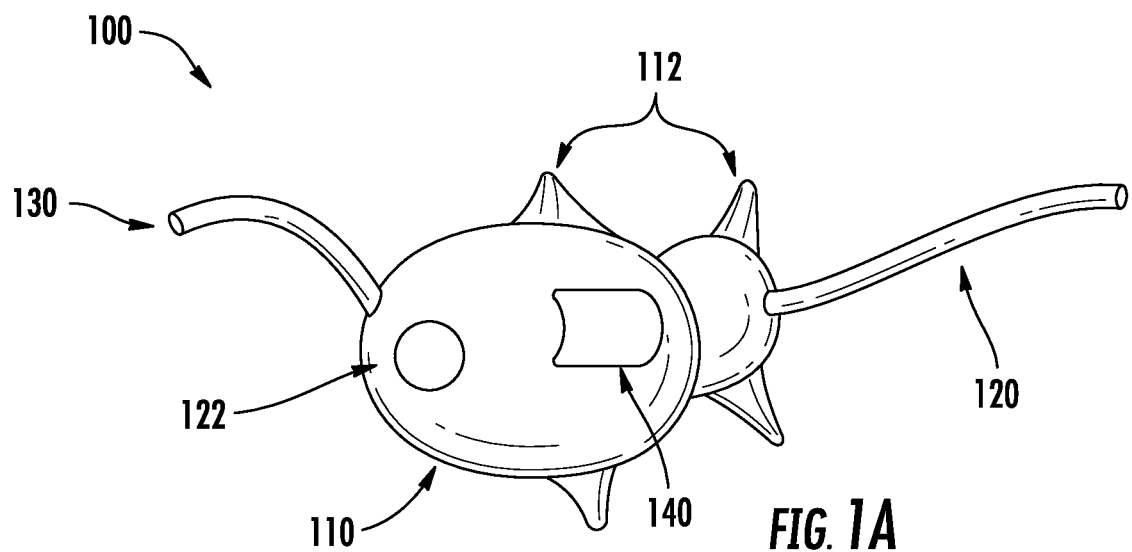
FIGS. 1A-3 show example in-ear devices for control of remote devices.

Examples are described herein in the context of systems and methods for enabling in-ear control of remote devices. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

In one illustrative example of a system for in-ear control of remote devices, a user inserts an earbud into their ear canal or a pair of earbuds into their ear canals. Each earbud may be sized to fit securely in the user's ear canal through the use of a deformable plastic in the earbuds' housing. However, unlike a more traditional earbud, these earbuds do not entirely occlude the ear canal. Instead, each earbud has protrusions of a deformable plastic or silicone material extending from the earbud housing that are arranged to engage with the user's ear canal to hold the earbud in place. Each protrusion is spaced from each other protrusion to provide gaps between the protrusions to allow some sound to pass by the earbud and travel down the ear canal without necessarily passing through the structure of the earbud.

Each earbud is equipped with multiple microphones, a speaker, at least one antenna for wireless communications, a processor and memory, and a battery. When the earbud is inserted into the user's ear, it turns itself on based on pressure applied to the protrusions discussed above. After powering on, the processor activates the microphones, and begins monitoring audio signals received from the microphones.

In this example, one microphone is directed inward and further down the ear canal toward the user's eardrum. This first microphone may be used as a voice activity detector, or to pick up voice frequencies lower than about 1000 Hz. In addition, another microphone is oriented outward towards the exterior of the user's ear. This second microphone may be used to pick up voice frequencies higher than about 1000 Hz. As the user speaks, the microphones each pickup different aspects of the user's speech and provide it to the processor to be processed.

In this example, the processor attempts to convert the received audio signals using a speech recognition technique having a limited vocabulary of keywords and commands. The processor first attempts to locate a keyword indicating the beginning of a voice command, as opposed to just conversational speech. In this example, the processor looks for the keyword "Jane" in speech it is able to recognize, and upon recognizing the word "Jane," looks for keywords corresponding to commands and a device to be controlled. For example, the earbud may hear the user say "Jane turn on the television."

In response to detecting the keyword "Jane," and recognizing the command "turn on the television," the earbud attempts to identify the specific device to be turned on. In this example, Jane activates a Bluetooth transceiver and searches for nearby devices available for pairing. If the earbud identifies a device that is, or could be, a television, the earbud pairs with the device and transmits a command to turn the television on. The earbud then generates and outputs an audio signal via the speaker requesting confirmation that the correct device was turned on, and awaits a response with the keyword "yes." Upon receiving the "yes" response, the earbud creates an entry in a data structure stored in the earbud's memory with the device's identity from the Bluetooth pairing and the device type of "television."

In addition to employing Bluetooth to identify nearby devices, the earbud also is equipped with a WiFi transceiver and/or a GPS or other type of location signal receiver and can determine its location based on received Bluetooth, WiFi, GPS, or other signals. Thus, in some examples, remote devices may be connected to a local network within a building, such as the user's house. Over time, as the earbud establishes locations within the house based on available positioning signals, and commands issued by the user to particular devices, the earbud is able to create an approximate mapping of the environment and the locations of various devices. These locations may then serve as contextual information for selecting a device to be commanded. For example, if a user says "Jane turn on the television," but the house has four different televisions, the earbud may use its determined location as well as previously-determined locations of the various televisions to transmit a signal to the appropriate television to turn it on.

Furthermore, the in-ear device may employ recognition of spoken words corresponding to locations. For example, if a user says "Jane turn off the television in the kitchen," the earbud may use the spoken location, "kitchen," to determine which television to turn off.

When interacting, for example with a smart television, and attempting to access protected content, such as a streaming video account or an online retail store, the earbud may be able to issue commands to access the content based on voice recognition of the speaker (also referred to as "speaker recognition"). Thus, if the speaker's voice is recognized and is associated with the corresponding streaming video account, the earbud may authenticate the user to the streaming video service, such as by supplying a PIN, password, or other authentication information stored in the earbud and accessible upon recognition of the user's voice, or may be stored on the user's smartphone or other wearable device, which may instead be used for user authentication. Furthermore, the earbud may correlate sound energy picked up inside the ear canal of a user to determine whether the voice recognized was that of the wearer, or that of another speaker in close proximity to the earbud.

This illustrative example is given to introduce the reader to the general subject matter discussed herein and the disclosure is not limited to this example. The following sections describe various additional non-limiting examples and examples of systems and methods for systems and methods for in-ear control of remote devices.

Figure 1B:
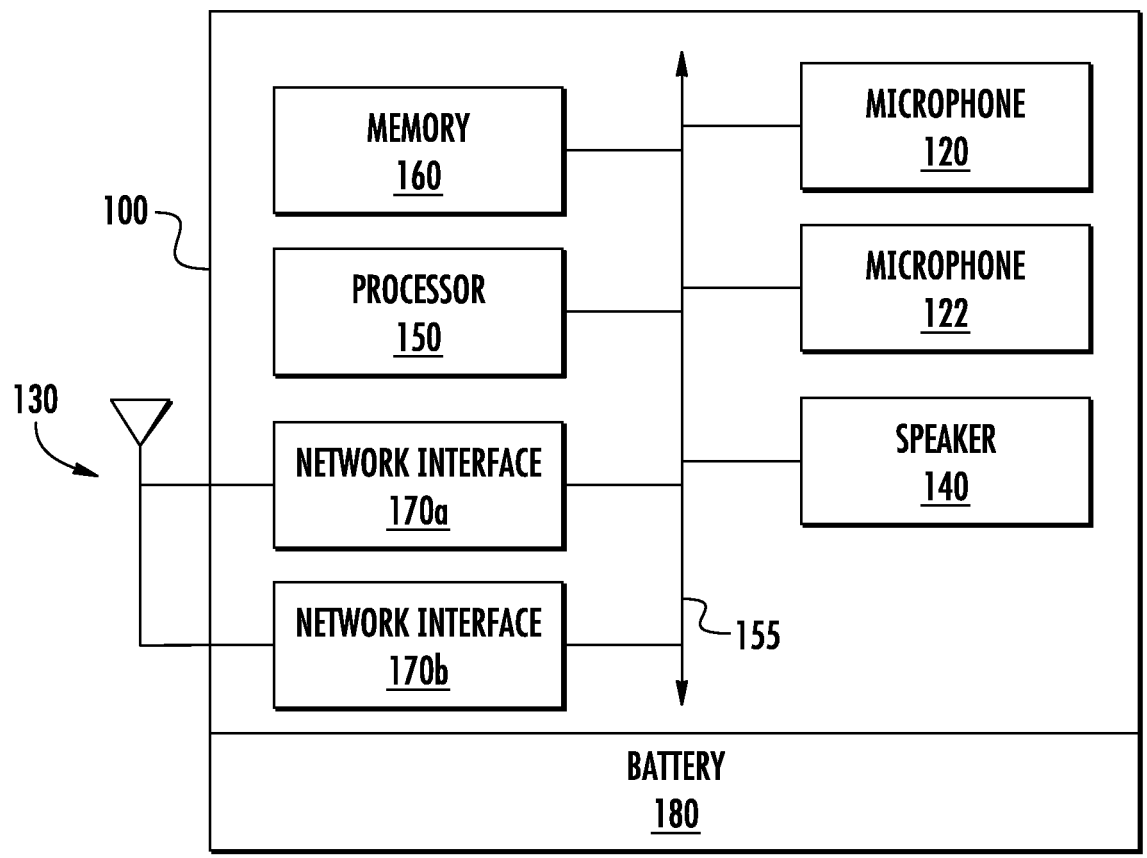

Referring now to FIGS. 1A-1B, FIGS. 1A-1B show an example in-ear device 100 for control of remote devices. In this example, the in-ear device 100 may be referred to as an "earbud." The in-ear device 100 includes a housing 110 that is sized to be smaller than a diameter or perimeter of an average ear canal for a target demographic, such as men, women, or children within various age groups. The housing 110 has several projections 112 extending from it, which are made from a flexible material, such as a silicone or similar material. However, rather than encircling the entire housing to plug the entire ear canal to isolate the eardrum from the external environment, the projections 112 are constructed such that they engage with the walls of the ear canal to hold the in-ear device 100 in place, once inserted into a wearer's ear, but also to define spaces between each projection 112 to allow air and sound to flow past the projections into the ear canal. Further, in some examples, one or more of the projections may include or be coupled to a pressure-sensitive switch or contact-sensitive sensor that, when switched on, e.g., by a projection encountering a wall of the ear canal, may turn on the in-ear device 100. In some examples, the in-ear device 100 may only turn on when multiple (or all) of the projections activates a corresponding pressure-sensitive switch. These contact points may also provide means for measuring biometric parameters such as heart rate, temperature, blood oxygen level and blood pressure and vibrations caused by speech, chewing, drinking, etc.

The in-ear device 100 also includes two microphones 120, 122, though in some examples, it may have only one microphone or more than two. One microphone 120 is oriented towards the interior of the ear canal and a wearer's eardrum, when the in-ear device is worn. In this example, the microphone 120 is enclosed within a protrusion from the housing 110 to place the microphone nearer a wearer's eardrum than were the microphone 120 mounted directly to the housing 110 or disposed within the housing 110. In this example, the microphone 120 is a transducer, such as a micro-electro-mechanical-system ("MEMS") transducer, which may be a membrane-type or vibration-type transducer. In some examples, the microphone 120 may be a light-based (optical or laser) transducer which is capable of capturing images or reflections of vibrations, e.g., of the eardrum, and converting detected vibrations in the images to sound waves. In some examples, the microphone 120 may be a light-based (optical) transducer that uses a fiber optic lead with photodiode to acquire signals close to the eardrum.

The in-ear device 100 also includes a second microphone 122 that is disposed within the housing 110 and is oriented towards the exterior of a wearer's ear when device 100 is properly inserted into the wearer's ear. In this example, the second microphone 122 is a MEMS-type transducer, but may be any other suitable type of microphone.

The in-ear device 100 also includes two wireless transceivers 170a-b that are each connected to a multi-mode antenna 130, which can also be used to extract the in-ear device 100 from the wearer's ear canal. In this example, the wireless transceiver includes a Bluetooth transceiver 170a and a WiFi transceiver 170b to enable the in-ear device 100 to communicate with other wireless devices. While this example uses Bluetooth and WiFi, other suitable wide-area, local-area and body-area wireless communication technologies may be used, such as cellular, near-field communications ("NFC"), near-field magnetic inductance ("NFMI") or others.

In addition, in this example, the antenna 130 is configured to enable wireless charging of the in-ear device's battery 180. For example, the antenna 130 may be arranged in a coil shape to enable inductive charging. In some examples, a separate antenna may be provided for wireless charging of the battery or wireless communication.

In addition to the components discussed above, this example in-ear device 100 includes a speaker 140, a processor 150 and memory 160, and a battery 180. As can be seen in FIG. 1B, the processor 150, memory 140, network interfaces 170a-b, microphones 120-122, and speaker 140 are all in communication via one or more buses 155.

In this example, the speaker 140 is arranged to output audio signals into the wearer's ear canal. And while this example in-ear device 100 includes one speaker 140, other example devices may include more than one speaker. In addition, the processor 150 and memory 160 are configured to store and execute program code, as will be discussed in more detail below.

In some examples, the in-ear device may include other sensors, such as inertial sensors, bone conduction microphones, vibration sensors, electromyography ("EMG") sensors to detect muscle, e.g., jaw movement, etc. Such sensors may be used alone or in conjunction with the microphones 120, 122 shown in FIG. 1.

Figure 2:
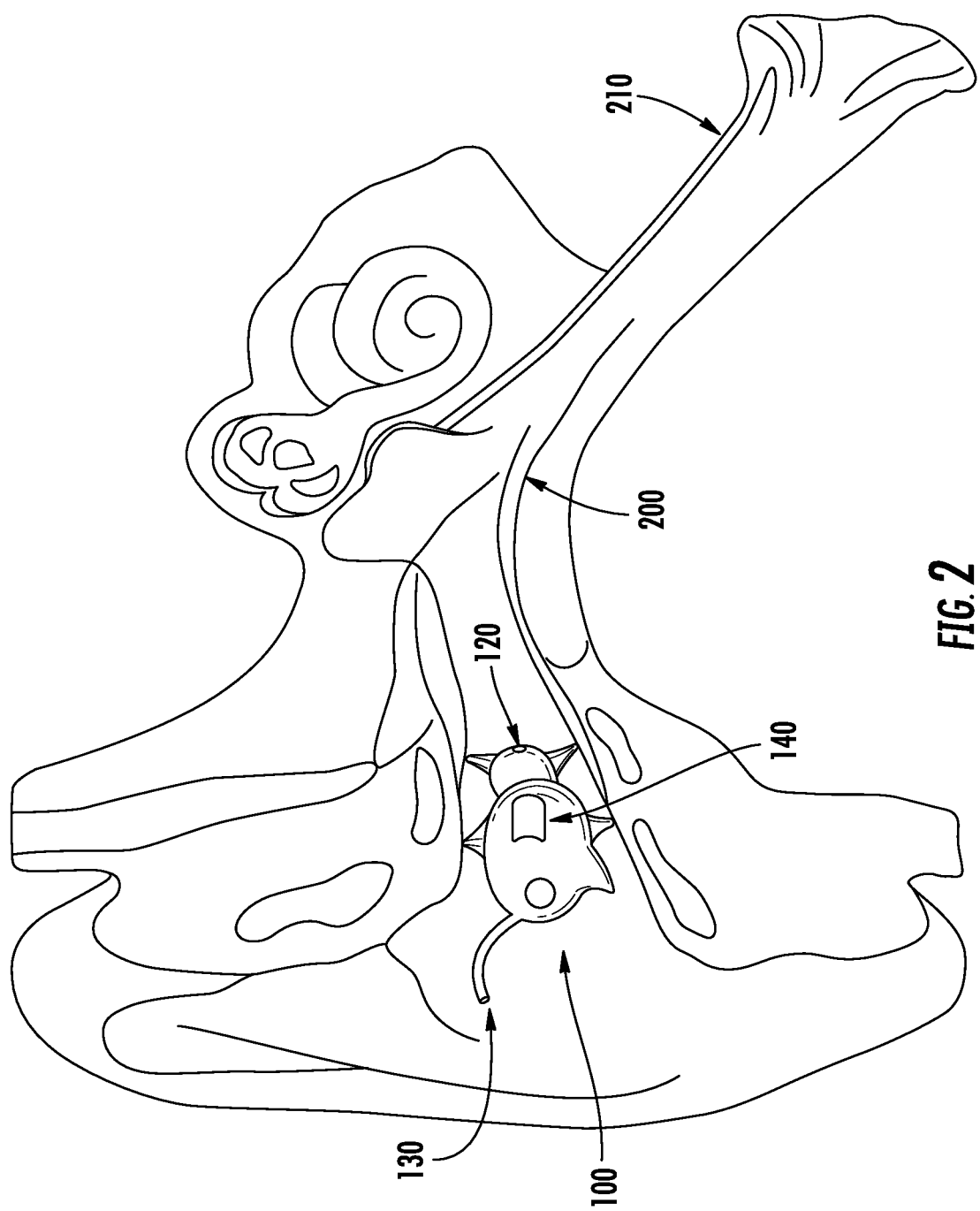
Figure 3:
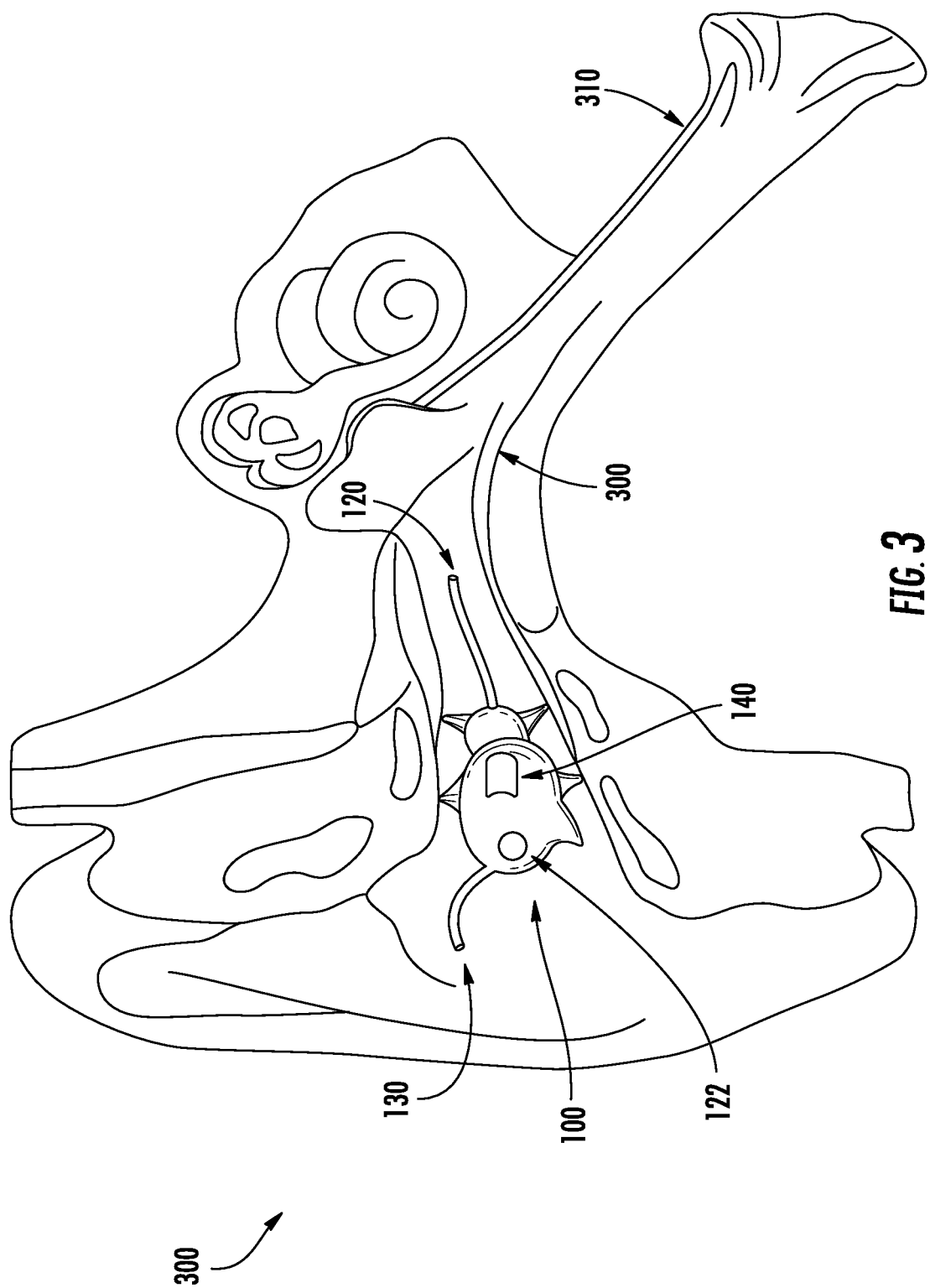

Referring now to FIGS. 2 and 3, FIG. 2 shows an example in-ear device 200 that is similar to the in-ear device shown in FIG. 1, however, while the in-ear device 200 in this example includes a microphone oriented towards the interior of the wearer's ear canal, the microphone is disposed within the housing of the device 200, rather than within a protrusion extending from the device 200 as illustrated in FIG. 1. FIG. 3 shows the in-ear device 100 of FIG. 1 that has been inserted into a wearer's ear. As can be seen, the interior microphone 120 extends inwards in the ear canal towards the wearer's eardrum 200.

Referring again to the in-ear device 100 of FIG. 1, when the wearer speaks, sound waves from the wearer's vocal chords travel into the external environment and strike the external microphone 122, and also pass by the in-ear device 100 to travel to the wearer's ear drum 200, and may also be received by the internal microphone 120. In addition, sound waves are conducted through the wearer's head, including through the bones in the skull and the Eustachian tubes 210, 310 (illustrated in FIGS. 2 and 3), and into the ear canal, where they are detected by the internal microphone 120. As discussed above, some examples according to this disclosure may also include one or more bone conduction microphones that may also detect sound waves travelling through the bones in the wearer's head, including the skull or jaw.

Sound waves detected as audio signals by the various microphones 120, 122 (including bone conduction or optical microphones, in different examples), are transmitted to the in-ear device's processor to be processed as will be discussed in more detail below, but may include speech recognition to identify commands to be transmitted to other electronic devices; voice recognition to authenticate a command detected from a speech recognition of received audio signals; training of speech or voice recognition algorithms, e.g., machine learning algorithms, neural network algorithms (e.g., deep neural networks such as recursive neural network ("RNN")), Hidden Markov Model ("HMM") algorithms, etc.; filtering of audio signals or noise reduction or echo cancelling; identification and recognition of other electronic devices to be commanded by the in-ear device 100, etc.

Figure 4:
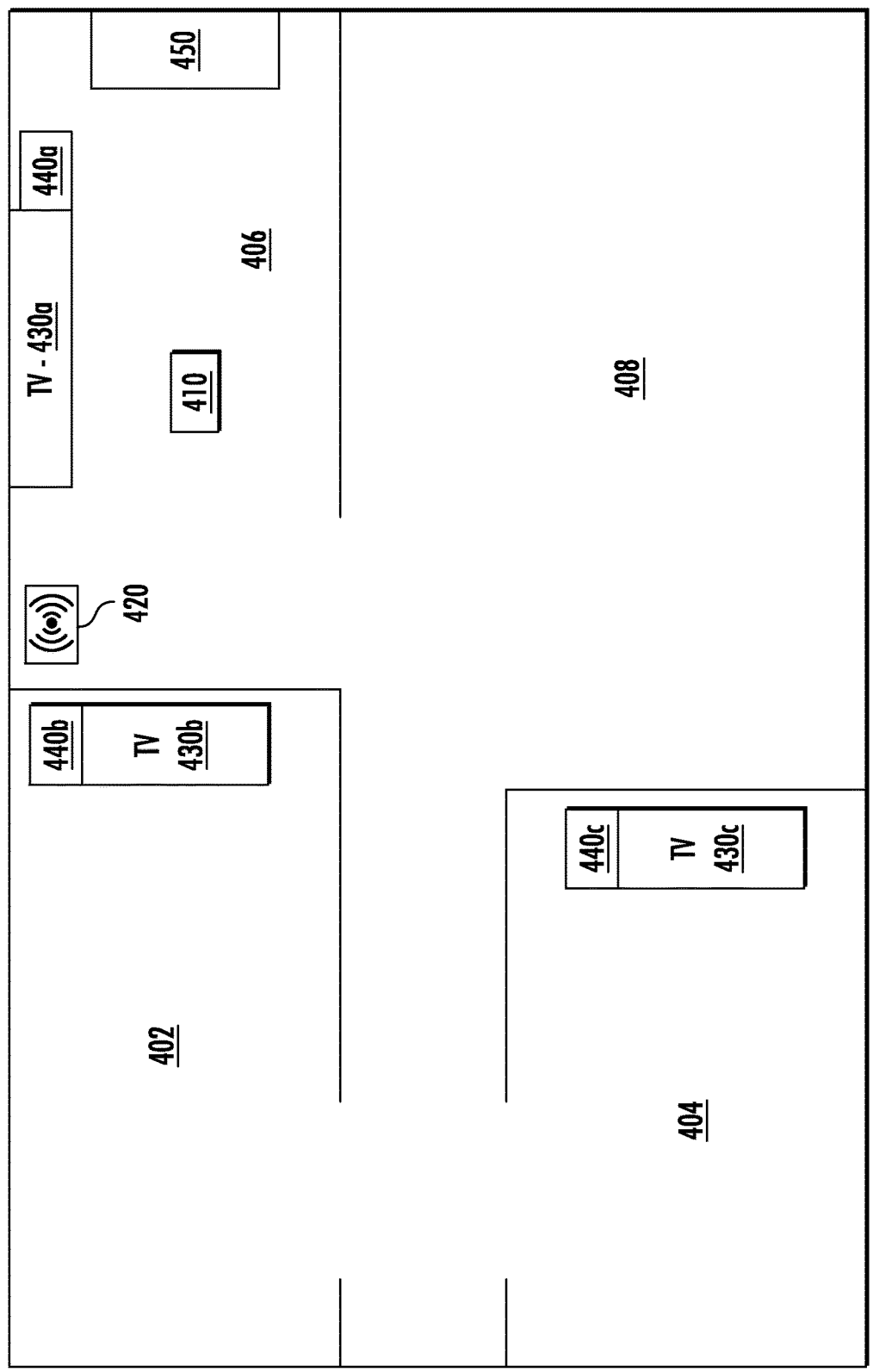
FIG. 4 shows an example environment for in-ear control of remote devices.

Referring now to FIG. 4, FIG. 4 illustrates an example environment 400 for in-ear voice control of remote devices. In this example, the environment is the first floor of the wearer's house, which has multiple rooms 402-408. The environment includes multiple electronic devices that are connected directly to each other and/or to a local area network ("LAN") established within the house, which is connected to the Internet via an Internet service provider ("ISP"). To connect with the LAN, devices connect with a wireless access point ("AP") 420, which in this example is a WiFi router using the 802.11ac protocol, though any suitable wireless networking technology may be employed. Smart TVs 430a-c are each connected to the LAN via the AP 420 and are able to retrieve content from the Internet. The smart TVs 430a-c also each have a video/audio streaming device 440a-c connected to them, such as Roku, Apple TV, Google Chromecast, etc., each of which is connected to the wireless AP 420 either directly via a WiFi interface within the respective video/audio streaming device 440a-c, or indirectly via an electrical connection to the corresponding smart TV 430a-c.

In addition to the smart TVs 430a-c and video/audio streaming devices 440a-c, the environment also includes an entertainment hub 410 and a stereo system located in the house's living room 406. The entertainment hub 410, such as an Amazon Echo or Google Home device, can be used to retrieve information from the Internet or control one or more devices within the house. However, because the hub 410 is stationary within the living room 406, the hub may have difficulty understanding voice commands spoken by persons in other rooms of the house or may be entirely unable to "hear" those commands. To address this issue, the homeowner (or renter) may opt to purchase multiple hubs 410, and position them in additional rooms 402-408, though this presents a potential problem where a spoken command is recognized at multiple hubs 410.

The stereo system has a smart receiver 450 that is wirelessly connected to the wireless AP and to the smart TV 430a and video/audio streaming device 440a in the living room 410. The smart receiver 450 is able to stream audio content from online music services, such as Spotify, Pandora, etc., as well as provide audio output for content, such as movies or TV programs, displayed on the smart TV 430a or streamed via the video/audio streaming device 440a.

When returning home after work, the homeowner inserts in-ear devices 100 into each of her ears. Upon detecting being inserted into her ears, the in-ear devices 100 power on and connect to the wireless AP 420. In addition, the in-ear device 100 accesses information about received WiFi signals, such as received signal strength indicator (RSSI), time-of-flight information, or a WiFi signal heatmap of the house stored either on a network storage device connected to the LAN or from storage in a cloud service provider or from memory within the in-ear device 100. For example, based on the heatmap, the in-ear device 100 is able to determine the wearer's position within the house. In addition to the heatmap, the in-ear device 100 accesses information about the layout of the house, such as the names and locations of various rooms within the house.

As she walks into the house, she enters her home office 402 and issues a voice command to "Play Spotify classical music." The in-ear device 100 receives the spoken audio via its microphones 120-122, locally performs speech recognition on the received audio signals, and recognizes the command. In addition, the in-ear device 100 performs voice recognition to identify the speaker. In this example, the in-ear device 100 identifies the speaker as being the wearer based on audio signals received from the microphones 120-122 and corresponding signals from a bone conduction microphone. By performing spectral analysis of the audio signals received from the microphones 120-122 and the signals received by the bone conduction microphone, the in-ear device 100 is able to determine that the audio signals and the signals from the conduction microphones correspond to the same sounds and thus the received audio signals were generated by the wearer. In some examples, the in-ear device 100 may also be equipped with one or more EMG sensors. Signals received from such EMG sensors may indicate muscle activity corresponding to jaw movement, which may further be employed to determine that the audio signals were generated by the wearer. Further, absence of such EMG signals indicating jaw movement (or other relevant musculature) may indicate the wearer was not the speaker and may override a determination that the wearer was the source of the audio signals.

As mentioned above, the in-ear device 100 also performs voice recognition to identify the speaker, in this case as being the homeowner. Based on recognizing the speaker, the in-ear device 100 accesses configuration information, e.g., a user profile, specific to the speaker, such as preferred volume levels, noise cancellation functionality, playlists, preferred television channels or radio stations, etc.

Based on the command of "Play," the in-ear device 100 accesses its memory to identify candidate electronic devices with an associated "Play" command and identifies the smart receiver 450, each of the smart TVs 430a-c, and each of the video/audio streaming devices 440a-c. Upon recognizing the "Spotify" command, the in-ear device 100 searches the list of identified electronic devices for those capable of playing music via the Spotify application. In this case, the in-ear device narrows the candidate electronic devices to the smart receiver 450 and video/audio streaming devices 440a-c, which are all able to play music via the Spotify application.

To resolve the ambiguity as to which device to control, the in-ear device 100 determines its location within the house based on the heatmap, and using the house's layout information determines that it is located within the home office 402. The in-ear device then searches the narrowed list of electronic devices located in the home office 402 and identifies video/audio streaming device 440b as being located in the home office 402. It also identifies an association between the video/audio streaming device 440b and the smart TV 430b and issues commands to each, via the LAN, to power on (or exit a sleep mode) video/audio streaming device 440b. The in-ear device 100 then issues a command to the video and audio streaming device 440b to execute the Spotify application. In response, the video/audio streaming device 440b launches Spotify, and issues a command to Spotify to play music in the speaker's "classical music" playlist, rather than her husband's "classical music" playlist.

The in-ear device 100 then issues an audio confirmation to the user via the in-ear device's speaker 140.

Later, the user leaves the home office 402 and enters the living room 410. The in-ear device 100 determines that its new location is in the living room 410 and activates the smart receiver 450 by issuing a "power on" command and issues a command to the smart receiver 450 to launch the Spotify application and play the "classical music" playlist. In addition, the in-ear device 100 issues a further command to the video/audio streaming device 440b in the home office to stop playback. Thus, as the wearer moves within the house, the in-ear device(s) 100 tracks the movement while maintaining, when possible, a continuous listening environment. Alternatively, the video/audio streaming device may instead directly stream to the in-ear device 100, e.g., via Bluetooth, such that the wearer is able to hear the music as she moves within the house.

Later, the wearer issues a command to turn on the smart TV 430a and to launch a shopping application on the smart TV 430a. Again, the in-ear device 100 performs speech recognition on the spoken commands, determines its location to resolve the ambiguity as to which smart TV 430a-c to turn on, and issues a command to the smart TV 430a to turn on and launch the shopping application. In addition, to issuing the command, however, the in-ear device 100 performs voice recognition on the wearer's voice to determine the identity of the speaker. Upon recognizing the wearer's voice, and verification of the wearer's identity, the in-ear device 100 accesses login and password information for the shopping application and issues a command to the shopping application to log the wearer into her online shopping account. Later, when the wearer has selected items for purchase and attempts to complete the transaction, the in-ear device recognizes a command to "complete order" or "complete purchase" as a command requiring user authentication and again performs voice recognition on the audio signals corresponding to the "complete order" or "complete purchase" command. Upon both recognizing the wearer's voice and confirming that the recognized voice corresponds to the user account, the in-ear device 100 issues a command to the shopping application to complete the purchase of the selected items.

Thus, as is illustrated above, the in-ear device 100 may be used to command one or more electronic devices within an environment 400, but also to determine which device to command based on context information, such as the wearer's location in the house, and to verify the identity of a speaker before issuing certain commands, such as those providing access to secure online accounts or to complete financial transactions.

Figure 5:
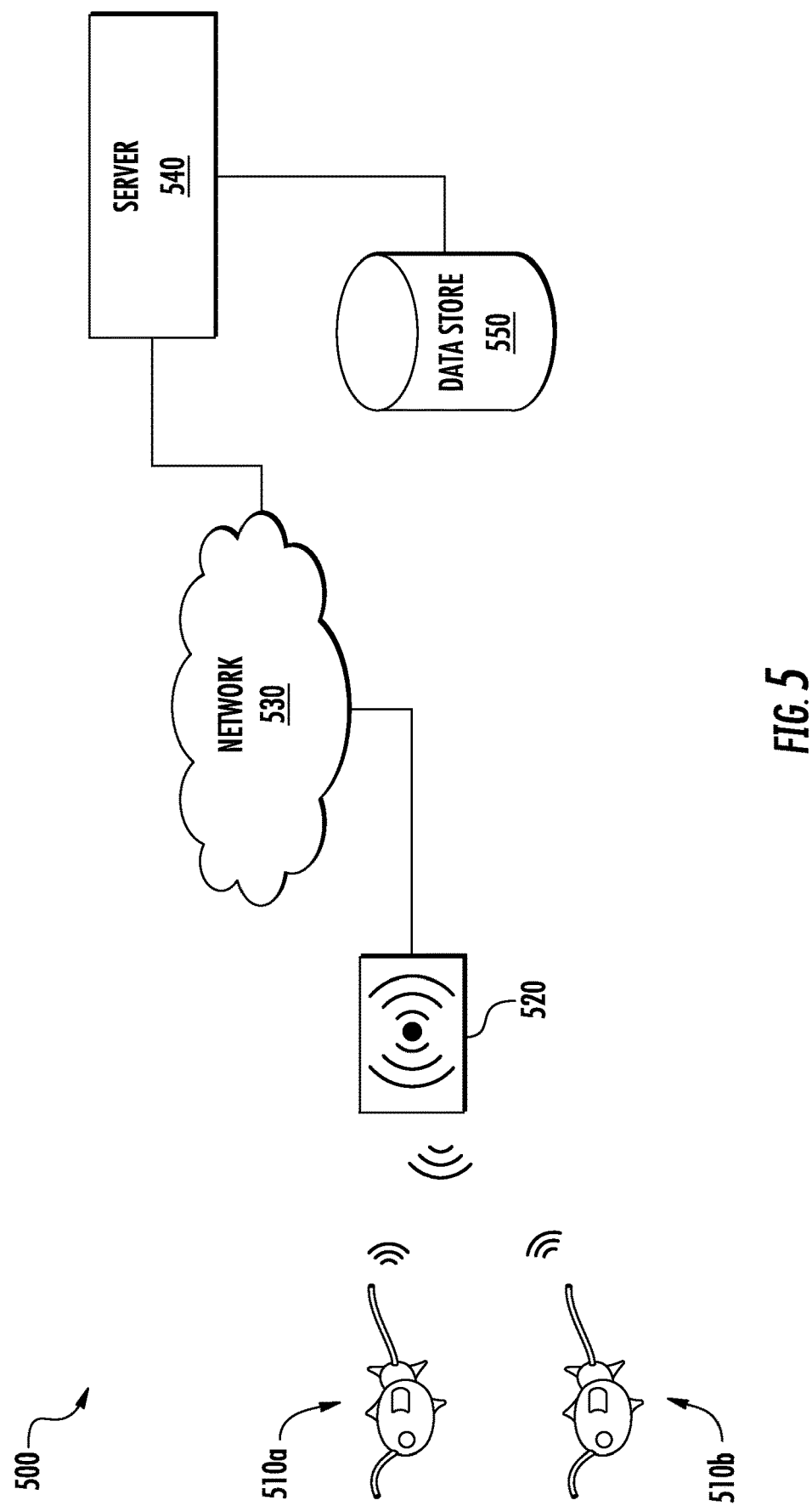
FIG. 5 shows an example system for in-ear control of remote devices.

Referring now to FIG. 5, FIG. 5 shows an example system 500 for in-ear control of remote devices. In this example, the system 100 includes two in-ear devices 510a-b, a wireless AP 520 connected to a network 530, such as the Internet. In addition, remote server 540, which is also connected to the network 530, has an associated data store 550. In this example, and as discussed above, each of the in-ear devices 510a-b includes a processor and memory as well as one or more wireless networking interfaces, which are used to connect the respective in-ear devices 510a-b to each other and to the wireless AP 520.

In this example, the in-ear devices 510a-b have somewhat limited processing capabilities, and thus, while they are capable of some voice detection and recognition and speech recognition, particularly of predefined commands for previously-identified devices, more complex speech or voice recognition, or training of the speech recognition or voice recognition algorithms may be more advantageously performed by a remote device, such as server 540. The server 540 may then provide updated coefficients or parameters for speech or voice recognition within the in-ear devices 510*a-b* or may receive audio signals from the in-ear device(s) 510*a-b* and perform speech or voice recognition on the received audio signals, and provide the recognized speech or speaker identity to the in-ear device. However, it should be appreciated that in some examples, the in-ear devices 510*a-b* may have full-featured voice detection and speech recognition capabilities rather than sometimes relying on assistance from a remote computing device.

In this example, the server 540 and data store 550 are located at a cloud service provider; however, in some examples, the server 540 or data store 550 may be located locally, such as within the wearer's house and connected to a LAN. The server 540 is configured to receive audio information from the in-ear devices 510*a-b* via its own networking connection to the network 530. After receiving the audio information, the server 540 extracts audio signals from received audio information as well as any additional information, such as processing commands. Such processing commands may include "speech recognition," "voice recognition," "speech training," "voice training," or others. After extracting audio signals and any associated information, the server 540 employs one or more speech or voice recognition techniques. The server 540 then generates and transmits information responsive to the audio information. Such responsive information may include text corresponding to recognized speech information, one or more commands identified within the recognized speech information, an identity of the speaker, an acknowledgement of the training data, or other suitable information. Such training may be employed to better recognize certain predefined commands, or may be employed to add new words to a vocabulary, such as to identify new electronic devices and associated new commands if needed.

To perform the speech or voice recognition, the server 540 may access speech or voice recognition techniques or parameters from the data store 550. Further, after receiving and processing training data, the server 540 may update such techniques or parameters in the data store 550, or transmit the parameters to the in-ear devices 510*a-b*.

Figure 6:
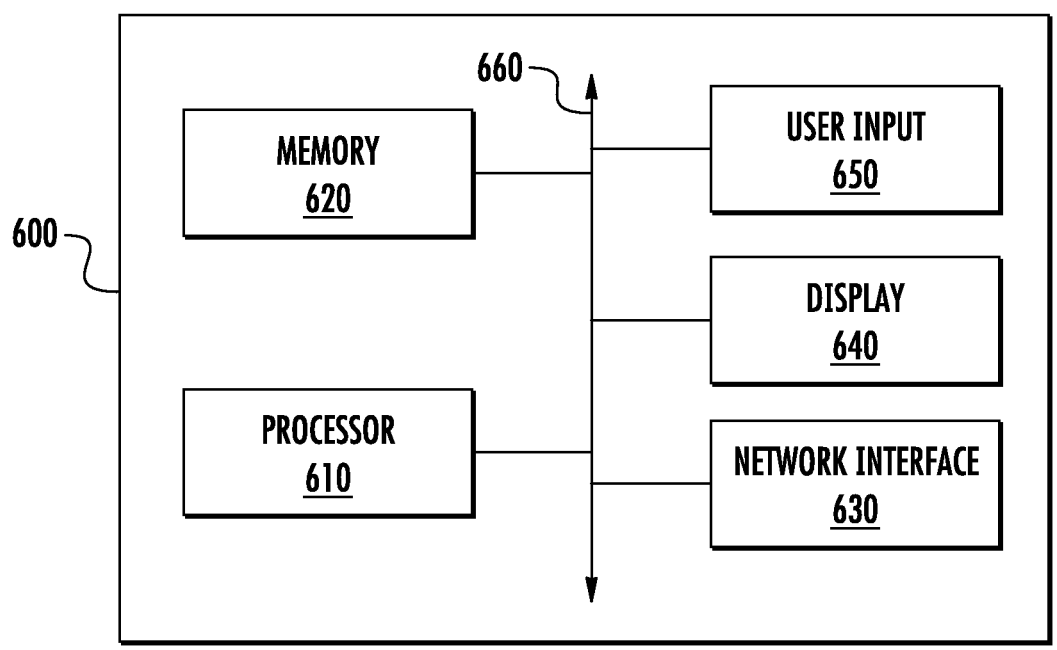
FIG. 6 shows an example computing device for in-ear control of remote devices.

Referring now to FIG. 6, FIG. 6 shows an example computing device 600 suitable for use with example systems for in-ear control of remote devices, such as server 540 shown in FIG. 5. The computing device 600 includes a processor 610, a memory 620, a network interface 630, a display 640, and one or more user input device 650. Each of these components is in communication with the other components via one or more communications buses 660. Examples of suitable processors and memories are discussed later in this specification. It should be appreciated that while this example computing device 600 includes a user input device 650 and a display 640, such components are optional and may not be present in some examples. Suitable network interfaces 630 may employ wireless Ethernet, including 802.11 a, ac, ah, g, b, or n standards. In one example, the network interface 630 can communicate using Radio Frequency (RF), Bluetooth, CDMA, TDMA, FDMA, GSM, Wi-Fi, satellite, or other cellular or wireless technology. In other examples, the network interface 630 may communicate through a wired connection and may be in communication with one or more networks, such as Ethernet, token ring, USB, FireWire 1394, 802.15.4, fiber optic, etc.

Figure 7:
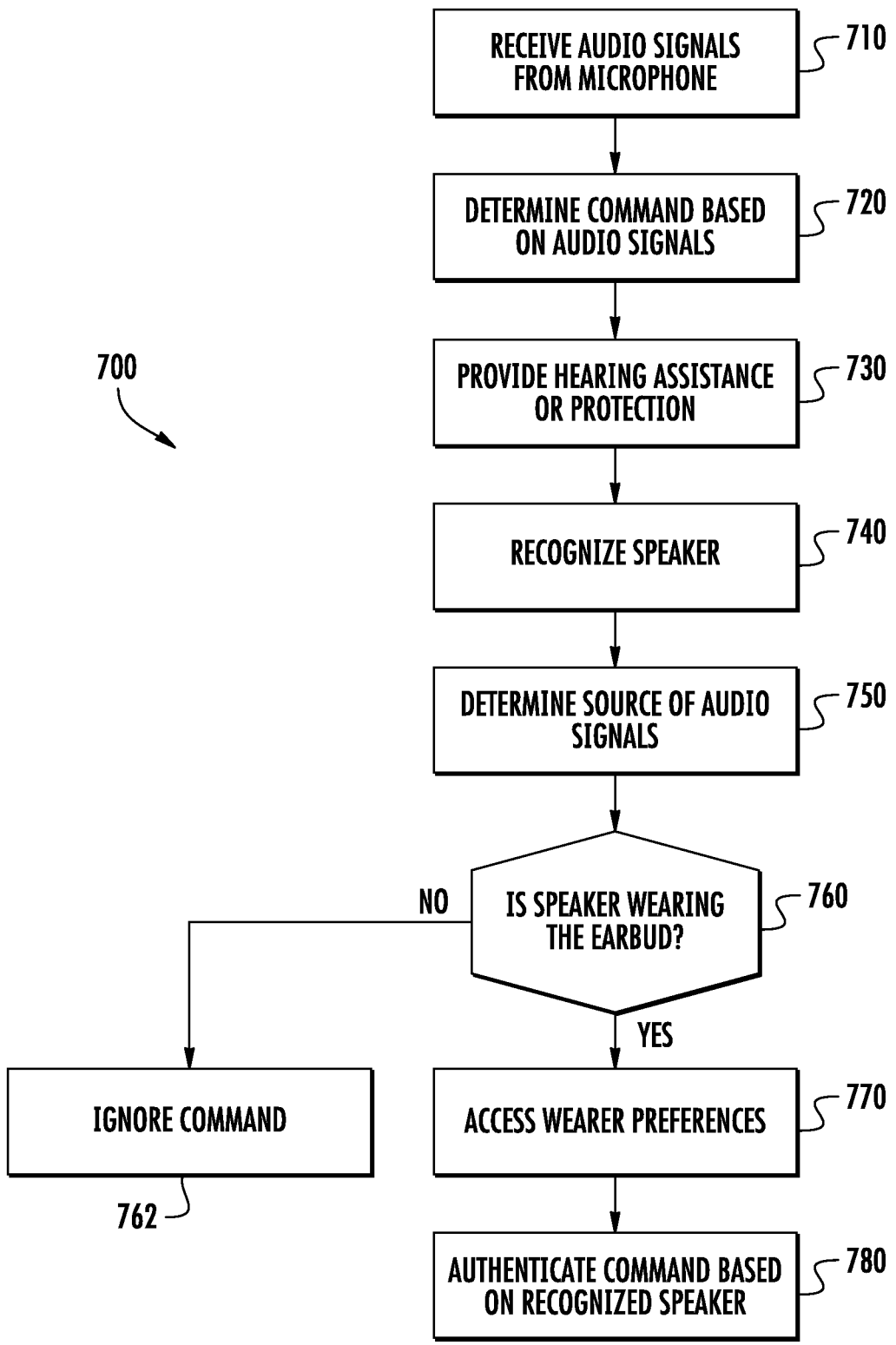
FIG. 7-9 show example methods for in-ear control of remote devices.

Referring now to FIG. 7, FIG. 7 shows an example method 700 for in-ear control of remote devices according to this disclosure. The description of this example method 700 will be made with respect to the in-ear device 100 of FIGS. 1A-1B; however, any suitable in-ear device or system according to this disclosure may be used.

At block 710, the in-ear device 100 receives audio signals from an audio source via one or more of its microphones. In this example, the audio signals are received via the microphone 120 oriented down the user's ear canal towards the user's eardrum; however, in some examples, the audio signals may be received via the microphone 122 oriented towards the exterior portion of the wearer's ear canal, by both microphones 120-122, or by other microphones according to different example in-ear devices, such as a bone conduction microphone or vibration sensors.

In this example, the audio signals were generated by the wearer's vocal chords while the wearer was speaking a command to the in-ear device. Thus, sound waves may travel may travel through the external environment, into the wearer's ear canal, and past the in-ear device 100 to the ear drum, or via the Eustachian tubes to the eardrum. Such sound waves may be received as audio signals at the microphone 120 or other microphones. However, in some examples, as discussed above, microphone 120 may be an optical microphone oriented towards the wearer's ear drum and configured to detect movement of the eardrum. The detected movement of the eardrum may indicate the sound waves received by the eardrum and thus may be considered audio signals when detected by the optical microphone. Further, as discussed above, vibrations originating at the vocal chords may be conducted via the wearer's skull, jaw, or other bone structures to the in-ear device 100 where they may be detected by a bone conduction microphone in some examples.

At block 720, the in-ear device 100 determines a command based on the audio signals using a speech recognition technique. In this example, the in-ear device 100 includes an HMM-based speech recognition technique with a limited vocabulary based on pre-defined commands and known electronic devices. Thus, the in-ear device 100 is able to recognize specific commands for specific devices, but otherwise, it is configured to transmit unrecognized audio signals to a remote computing device, such as remote server 540 shown in FIG. 5 for speech or voice recognition, or to train a speech recognition or voice recognition technique.

In this example, the in-ear device 100 receives the audio signals as described above with respect to block 710 and applies one or more filters to the audio signals, such as a bandpass filter to filter frequencies below approximately 300 Hz and above frequencies of approximately 3 kHz. In some examples, other filtering techniques such as echo cancellation, noise suppression, adaptive noise cancellation and equalization may be employed, which may be used to attenuate or amplify one or more frequencies within one or more predefined frequency ranges. The filtered audio signals are then provided to the HMM-based speech recognition technique to identify one or more spoken words. Identified spoken words may then be compared against a list of known words, such as commands to be performed, electronic devices to be controlled, applications to be executed, etc.

At block 730, the in-ear device 100 provides hearing assistance or protection to the wearer. In this example, the in-ear device 100 determines a magnitude or strength of the received audio signal. For example, the wearer may be in a loud environment and the audio signal received by the microphone 120, 122 may have a high magnitude, e.g., greater than approximately 75 dB. Such an audio signal may include components generated by the speaker's voice, environmental sounds, a speaker 140 on the in-ear device, etc. To reduce to strength of audio signals reaching the wearer's ear drum, the in-ear device 100 may reduce a volume of the speaker 140. Or the in-ear device 100 may generate noise-cancelling audio signals to cancel some of the environmental noise, e.g., from a vehicle engine or crowd noise, using, for example, a digital noise reduction technique. Such noise reduction may both help protect the wearer from damage to their hearing caused by excessively loud environmental noise and may assist the wearer when they are in a noisy environment by reducing the levels of undesirable environment sounds.

It should be appreciated that while hearing assistance or protection is illustrated as occurring at a particular time, it should be understood that such features may be active at all times or may be activated by the wearer or automatically activated by the in-ear device 100 based on a location of the in-ear device 100, which may be detected as described above. For example, the in-ear device 100 may be in communication with the wearer's smartphone and obtain location information from the smartphone. If the location information indicates that the wearer is located in a large public space, e.g., a museum, airport, theater, etc., the in-ear device 100 may activate hearing assistance or protection features. In some examples, however, the in-ear device 100 may determine to activate hearing assistance or protection features based on detected levels and duration of environmental noise.

The wearer may also or instead provide noise cancellation preferences, in some examples, such as by designating locations at which noise cancellation should be active, the type of noise that should be reduced or cancelled, or locations where noise cancellation should be disabled, e.g., to conserve battery power. Such locations may be designated explicitly or implicitly by the wearer. For example, the wearer may speak a command, or sub-vocalize a command, to activate or disable noise cancellation for a present location. In some examples, the in-ear device 100 may respond to the command with an audible question to the wearer asking if the wearer wants to always enable noise cancellation for the present location. It should be appreciated that a present location may include a building in which the wearer is present, e.g., an airport terminal, a mall, etc., or it may be a specific location and a small region surrounding the region, e.g., a circular region centered on the wearer with a radius of 300 feet. In some examples, such features may be tied to particular devices, such as when the user is watching television, attending a musical concert or the in-ear device 100 detects the user is in their car. Alternatively, to implicitly designate a location, the user may acquiesce or not disable such hearing assistance or protection features that are automatically enabled by the in-ear device 100 in response to, for example, detecting high levels of environmental noise or detecting a decibel level within the wearer's ear canal, or in the environment, exceeding a pre-determined threshold, e.g., 60 dB. The user may also set the desirable threshold manually or via a voice command.

At block 740, the in-ear device 100 recognizes the speaker based on the received audio signals. For example, the in-ear device 100 may perform a voice recognition technique to determine an identity of the audio source. In this example, the in-ear device 100 provides the filtered audio signals to a voice recognition technique. In this example, the in-ear device 100 uses an HMM-based voice recognition technique, though in other examples, other suitable voice recognition techniques may be employed, including Gaussian mixture models, neural networks, etc. If the voice recognition technique recognizes the speaker, it outputs an indication of the identified speaker, such as a textual name or an identification number. However, if the voice recognition technique does not recognize the speaker, it may output an error code or a "not recognized" indication. In some examples, the voice recognition technique may transmit the filtered audio signals to a remote computing device, such as remote server 540 shown in FIG. 5 for further voice recognition processing.

At block 750, the in-ear device 100 determines the source of the audio signals. In this example, the in-ear device determines whether the audio signals originated with the wearer of the in-ear device 100 or with another entity, such as another person or an electronic device, e.g., a speaker in a home entertainment system. In this example, the in-ear device 100 determines the source of the audio signals based on voice recognition. If the recognized voice is associated with a registered owner of the in-ear device 100, stored in memory 160, the in-ear device 100 determines that the speaker is the wearer of the device. In some examples, however, the in-ear device 100 may also analyze additional input signals, such as signals received from a bone conduction microphone or from an EMG sensor. If signals received from one or more of these sensors do not indicate the wearer was speaking at a time when the audio signals were received, the in-ear device 100 may determine that the wearer is not the source of the audio signals, even if the voice recognition technique identifies the wearer. For example, the in-ear device 100 may determine, instead, that it is receiving previously-recorded speech, or that the voice recognition technique incorrectly identified the speaker.

In some examples, in addition to determining that the wearer of the in-ear audio device 100, the in-ear device 100 may employ further authentication techniques to ensure that the wearer is the recognized speaker. For example, the in-ear device 100 may employ a multi-factor authentication technique to recognize the speaker. In one example, as discussed above, the in-ear device 100 recognizes the speaker based on the received audio signals and also employs the bone conduction microphone to correlate the audio signals received via one microphone with the vibrations received by the bone conduction microphone. Upon detecting such a correlation, the in-ear device 100 may both determine that the speaker is the wearer of the in-ear device 100, but also authenticate the wearer as the recognized speaker.

In some examples, other multi-factor authentication techniques may be employed. For example, the in-ear device may, in some examples, comprise one or more sensors, such as accelerometers, gyroscopes, photoplethysmogram ("PPG"), electrocardiogram ("ECG"), body temperature, etc. The processor 150 may receive one or more signals from one or more accelerometers, gyroscopes, or other sensors and, based on one or more machine learning techniques, verify that a movement or gait pattern, heart rate, or speaking patterns corresponds to a particular wearer. The recognized wearer based on such sensor input may be compared against a recognized speaker from a voice recognition technique, and upon detecting a match, authenticate the wearer. Suitable machine learning techniques may be trained explicitly by the wearer based on walking pace, movements of the wearer's head or jaw while speaking one or more training phrases, a position or orientation of the wearer's head during one or more activities, such as sitting, standing, walking etc. Such multi-factor authentication techniques may improve the security of the in-ear device 100 and help to prevent unauthorized access to wearer-specific functions, such as accessing bank accounts, making online purchases, accessing health records, etc.

At block 760, the in-ear device 100 either proceeds to block 770 if the wearer is identified as the source of the audio signals, or to block 762 if the wearer is not the source of the audio signals. However, in some examples, the in-ear device 100 may instead determine whether speaker is authorized to issue the recognized command, even if the speaker is not the wearer of the in-ear device 100. For example, the wearer may authorize one or more other speakers to issue commands to remote electronic devices via the in-ear device. After recognizing the speaker, and despite the in-ear device 100 determining that the speaker is not the wearer of the in-ear device 100, the in-ear device 100 may accept the command and proceed to block 770 rather than block 762. However, in some examples, the method 700 may proceed to block 760, even if the recognized speaker is not wearing the earbud, such as if the recognized speaker is identified as an authorized speaker.

In some such examples, if an authorized person who is not wearing the in-ear device 100 attempts to issue a command to the in-ear device 100, the in-ear device 100 may output a prompt, such as an audio prompt, to the wearer to obtain confirmation that the command issued by the non-wearer should be issued. For example, the in-ear device 100 may play a low-volume synthesized voice effect via its speaker 140 asking "authorize command?" The wearer may then speak or sub-vocalize a response, which may be recognized and authenticated via an additional execution of the method 700 of FIG. 7, while suspending the originally-issued command pending the confirmation from the wearer.

At block 762, the in-ear device 100, in this example, ignores the recognized command and takes no further action. For example, the in-ear device 100 may determine that the received command was issued by a speaker that is not authorized to issue the command, e.g., to complete a financial transaction, or the in-ear device 100 may include a setting to only allow commands spoken by the authorized wearer to be acted upon.

At block 770, the in-ear device 100 accesses wearer preferences based on the recognized speaker identified at block 740. In this example, the in-ear device 100 maintains in non-volatile memory one or more wearer profiles having wearer preferences. However, in some examples, the in-ear device 100 may communicate with a remote computing device to obtain one or more wearer preferences based on the recognized speaker. In this example, wearer preferences include a desired speaker volume, noise cancellation settings, favorite channels, and media playlists. However, in other examples, other wearer preferences may be employed and applied to functionality provided by the in-ear device 100.

At block 780, the in-ear device 100 authenticates the command based on the identity of the audio source and transmits a signal to a remote electronic device, the signal configured to cause the remote electronic device to execute the command. In this example, the in-ear device 100 determines that the wearer issued the command and, based on the command, identifies the target remote device, e.g., a smart TV or a streaming video player, and transmits a command to the remote electronic device. For example, the command may be to "Play classical music" as described above with respect to the environment of FIG. 4. Thus, after determining that the wearer issued the command, the in-ear device may transmit a command to a smart stereo receiver 450 to play a play list containing classical music.

Further, in some examples, the user may have enabled personalization settings that may be used to modify recognized commands. For example, if the in-ear device 100 recognizes the wearer as "John," or after it authenticates the wearer as discussed above, it may modify the recognized command, e.g., "Play classical music," to insert the wearer's name as an adjective to modify the object of the command: "Play John's classical music." The modified command may then be issued.

It should be appreciate that the blocks of the method 700 described above may be executed in any suitable order, and no order should be inferred by the ordering above or shown in FIG. 7. For example, block 750 may be performed prior to block 740 where the source of the audio signals is determined prior to attempting to recognize the speaker. Further, while the method 700 described above includes actions related to determining the identity of the speaker of a command, such actions are not required. Instead, the method 700 may proceed from block 730 to block 770 where the command is issued to the target remote electronic device without identification or authentication of the speaker.

Figure 8:
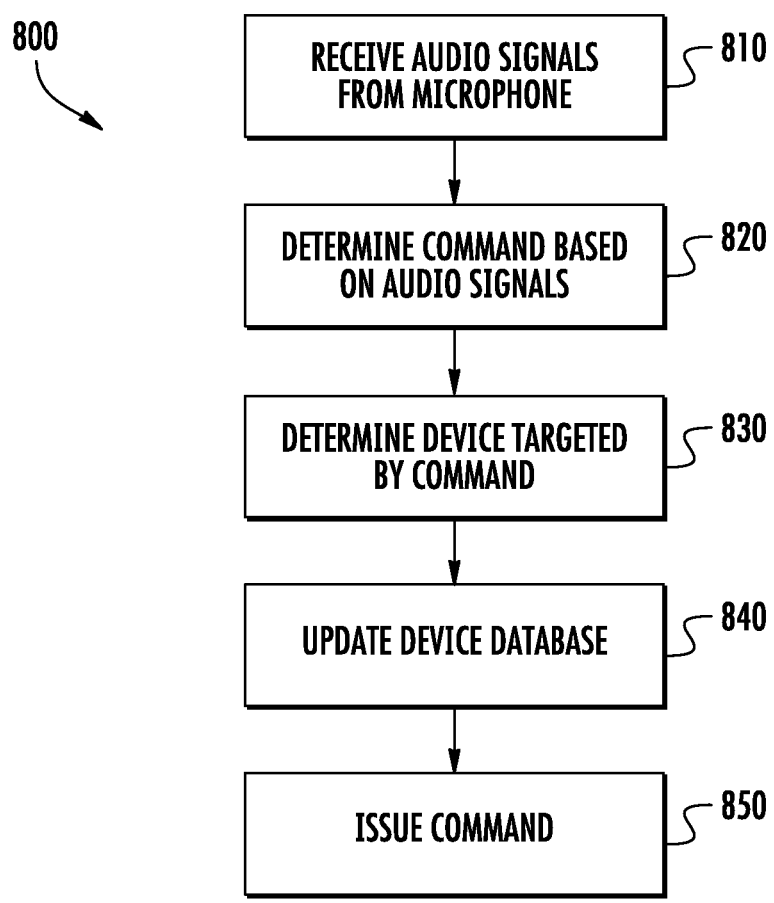

Referring now to FIG. 8, FIG. 8 shows another example method 800 for in-ear control of remote devices according to this disclosure. The description of this example method 800 will be made with respect to the in-ear device 100 of FIGS. 1A-1B; however, any suitable in-ear device or system according to this disclosure may be used.

At blocks 810 and 820, the in-ear device 100 receives audio signals from a microphone and determines a command based on the audio signals generally as described above with respect to blocks 710 and 720 of FIG. 7.

At block 830, the in-ear device 100 determines a device targeted by the determined command. In this example, the in-ear device 100 maintains records of known devices and associated information, such as location information, a type of electronic device (e.g., television, stereo receiver, smart speaker, digital assistant, etc.), an appliance such as a washer, a security system, an IP camera, an HVAC controller such as Nest thermostat, network address (e.g., an IP address), Bluetooth pairing information (e.g., a Bluetooth PIN), etc. After determining a command based on the audio signals, the in-ear device 100 may use other recognized information from the audio signals, such as a name of a device or of a type of device. The in-ear device 100 may then search its records for one or more known devices that match the recognized information from the command. For example, the command may include the keyword "video." The in-ear device 100 may then search the records of electronic devices for names of devices or types of devices corresponding to video streaming devices.

In some examples, instead of searching records of known devices, the in-ear device 100 may search for nearby devices, e.g., by searching devices available for Bluetooth pairing or NFC connection. Based on detected nearby devices, the in-ear device 100 may identify the devices based on a name assigned to the device, e.g., "living room DVR" or "kids' television," or other information received from the device, such as a manufacturer or model name or number. In some such examples, the in-ear device 100 may dynamically determine a targeted electronic device based on the environmental context, such as nearby devices or the in-ear device's location within an environment, e.g., a house.

In some examples, the speaker may identify a device not previously known to the in-ear device 100. In one such example, the in-ear device 100 may determine a new device has been identified based on recognizing a spoken command, but not the target of the command. The in-ear device 100 may then attempt to scan for nearby devices to identify any devices not previously known to the in-ear device 100. Upon identifying such a device, the in-ear device 100 may seek confirmation from the wearer that the newly-found device corresponds to the unrecognized device in the spoken command. Upon confirmation, the in-ear device 100 may create a new association between the identified device and the target of the command. In some examples, further information may be requested of the user, such as a device identifier, Bluetooth PIN, password, IP address, device manufacturer or model number, or other information to enable the in-ear device 100 to communicate with the device.

At block 840, the in-ear device 100 updates an internal record based on the targeted device. If the in-ear device 100 already had a record for the target device, the in-ear device may update a confidence score or rank for the device. If the in-ear device 100 did not previously have a record for the target device, the in-ear device 100 creates a new record for the device and stores information associated with the electronic device. Such information may include a device identifier, e.g., a name for the device or a type of device, set of common commands, location information, network address (e.g., an IP address), Bluetooth pairing information (e.g., a Bluetooth PIN), etc.

At block 850, the in-ear device 100 issues the command to the target electronic device generally as described above with respect to block 770 of FIG. 7.

Figure 9:
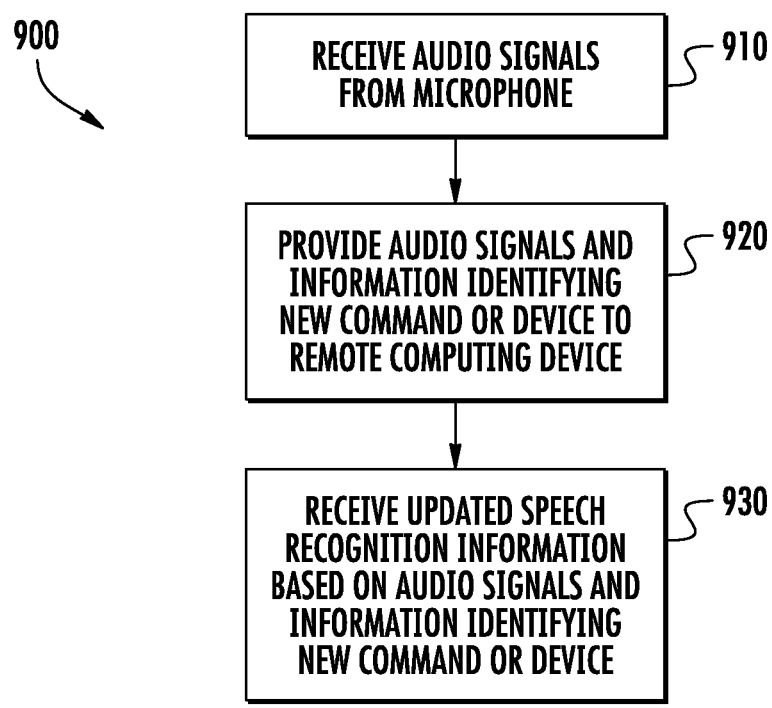

Referring now to FIG. 9, FIG. 9 shows another example method 900 for in-ear control of remote devices according to this disclosure. The description of this example method 900 will be made with respect to the in-ear device 100 of FIGS. 1A-1B; however, any suitable in-ear device or system according to this disclosure may be used.

At block 910, the in-ear device 100 receives audio signals from an audio source via one or more of its microphones generally as described above with respect to block 710 of FIG. 7.

At block 920, the in-ear device 100 provides the audio signals to a remote computing device. In this example, the in-ear device 100 encodes the audio (voice) signals using a suitable audio encoding technique such as pulse-code modulation ("PCM"), adaptive differential PCM ("ADPCM"), MPEG-1 or MPEG-2 Audio Layer III ("mp3"), a cellular audio encoder (e.g., half-rate, full-rate, enhanced full-rate, adaptive multi-rate, etc.) or any other suitable encoding technique. The encoded audio signals are then transmitted to the remote computing device via a wireless connection from the in-ear device 100 to a network, e.g., via an AP, or directly to a remote computing device via, e.g., a peer-to-peer connection.

In some examples, the in-ear device 100 may also provide additional information including speech information corresponding to the encoded audio signals. For example, the additional information may include the ground truth information for the encoded audio signals. In one example, the in-ear device 100 may output an audio prompt to the user via the speaker 140 to speak a phrase. The in-ear device 100 may then record audio signals generated by the wearer's vocal cords and encode the audio signals. The in-ear device 100 may then transmit the encoded audio signals and a representation of the phrase, such as textual representation of the phrase that may be used to train a speech recognition or voice recognition technique.

At block 930, the in-ear device 100 receives one or more updated coefficients or weights for a speech or voice recognition technique from the remote computing device 540 based on the audio signals. In this example, the remote computing device 540 performs a speech recognition technique on the received encoded audio signal to better train its speech recognition technique. In some examples, the remote computing device 540 may compare the output of its speech recognition technique with additional received information, such as ground truth information, to better train the speech recognition technique.

After performing the training, the remote computing device 540 may generate updated coefficients or weights usable with the speech recognition technique executed by the in-ear device 100. The remote computing device 540 may then transmit the updated coefficients or weights to the in-ear device 100. Upon receiving the updated coefficients or weights, the in-ear device 100 may update the coefficients or weights of its speech recognition technique. Further, while the above example was given with respect to a speech recognition technique, in some examples, the remote computing device 540 may perform a voice recognition technique to generate updated coefficients or weights for a voice recognition technique at the in-ear device 100.

While some of the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method comprising:
   receiving, by a microphone of an in-ear device, an audio signal from an audio source, the in-ear device inserted into a wearer's ear;
   determining a command based on the audio signal using a speech recognition technique;
   performing a voice recognition technique to determine an identity of the audio source;
   authenticating the command based on the identity of the audio source;
   determining context information associated with the in-ear device;
   determining a remote electronic device based on the command and the context information; and
   transmitting a signal to the remote electronic device, the signal configured to cause the remote electronic device to execute the command.

2. The method of claim 1, further comprising determining the wearer as the audio source.

3. The method of claim 1, wherein the microphone comprises an optical microphone oriented down the wearer's ear canal towards the wearer's eardrum.

4. The method of claim 1, wherein the in-ear device further comprises a sensor, and further comprising receiving a sensor signal from the sensor.

5. The method of claim 4, wherein the sensor comprises one or more of a bone conduction microphone, a vibration sensor, an optical sensor, or an electromyography ("EMG") sensor.

6. The method of claim 1, wherein determining the context information comprises determining a relative location of the in-ear device to one or more remote electronic devices.

7. The method of claim 1, further comprising storing information associated with the remote electronic device in a memory in the in-ear device.

8. The method of claim 1, further comprising:
   providing, by the in-ear device, the audio signal to a remote computing device;
   receiving, at the in-ear device, one or more updated coefficients or weights for a speech recognition technique from the remote computing device, the one or more updated coefficients or weights based on the audio signal; and
   updating, by the in-ear device, the speech recognition technique based on the one or more updated coefficients or weights.

9. The method of claim 8, further comprising:
   receiving, by the microphone of the in-ear device, a second audio signal from a second audio source, the in-ear device inserted into the wearer's ear;
   determining a second command based on the second audio signal using the speech recognition technique and based on the one or more updated coefficients or weights.

10. The method of claim 1, further comprising:
    determining a magnitude of the audio signal,
    responsive to determining the magnitude exceeds a threshold, generating a noise-cancellation signal based on the audio signal; and
    outputting the noise-cancellation signal to a speaker of the in-ear device, the speaker oriented down the wearer's ear canal towards the wearer's eardrum.

11. The method of claim 1, further comprising providing hearing assistance or protection, using a speaker disposed in the in-ear device, based on the audio signal.

12. The method of claim 1, determining the context information is based on one or more signals from at least one sensor.

13. An in-ear device comprising:
    a housing sized to be inserted into a wearer's ear canal;
    a plurality of projections extending from an outer surface of the housing, each of the projections configured to engage with the wearer's ear canal to hold the housing within the wearer's ear canal;
    a first microphone disposed within the housing;
    a second microphone disposed within the housing;
    a non-transitory computer-readable medium;
    a wireless transceiver; and
    a processor in communication with the non-transitory computer-readable medium, the wireless transceiver, and the first and second microphones, the processor configured to execute processor-executable instructions stored in the non-transitory computer-readable medium configured to cause the processor to:
      receive, from at least one of the first or second microphones, an audio signal from an audio source;
      determine a command based on the audio signal using a speech recognition technique;
      perform a voice recognition technique to determine an identity of the audio source;
      authenticate the command based on the identity of the audio source;
      determine context information associated with the in-ear device;
      determine a remote electronic device based on the command and the context information; and
      transmit, using the wireless transceiver, a signal to the remote electronic device, the signal configured to cause the remote electronic device to execute the command.

14. The in-ear device of claim 13, wherein the housing has a first end defined to be oriented towards the interior of the wearer's ear canal, and wherein the first microphone disposed within a first end of housing.

15. The in-ear device of claim 14, wherein the first end comprises a protrusion oriented to extend into the wearer's ear canal towards an eardrum, and the first microphone is disposed within the protrusion.

16. The in-ear device of claim 14, wherein the housing has a second end defined to be oriented towards an exterior of the wearer's ear canal, and wherein the second microphone is disposed within the second end of the housing.

17. The in-ear device of claim 13, wherein the processor is further configured to execute processor-executable instructions stored in the non-transitory computer-readable medium configured to cause the processor to determine the wearer as the audio source.

18. The in-ear device of claim 13, wherein at least one of the first or second microphones comprises an optical microphone oriented down the wearer's ear canal towards the wearer's eardrum.

19. The in-ear device of claim 13, wherein the in-ear device further comprises a sensor, and further comprising receiving a sensor signal from the sensor.

20. The in-ear device of claim 19, wherein the sensor comprises one or more of a bone conduction microphone, a vibration sensor, an optical sensor, or an electromyography ("EMG") sensor.

21. The in-ear device of claim 13, wherein the processor is further configured to execute processor-executable instructions stored in the non-transitory computer-readable medium configured to cause the processor to determine context information based on a relative location of the in-ear device to one or more remote electronic devices.

22. The in-ear device of claim 13, wherein the processor is further configured to execute processor-executable instructions stored in the non-transitory computer-readable medium configured to cause the processor to store information associated with the remote electronic device in a memory in the in-ear device.

23. The in-ear device of claim 13, wherein the processor is further configured to execute processor-executable instructions stored in the non-transitory computer-readable medium configured to cause the processor to:
provide the audio signal to a remote computing device;
receive one or more updated coefficients or weights for a speech recognition technique from the remote computing device, the one or more updated coefficients or weights based on the audio signal; and
update the speech recognition technique based on the one or more updated coefficients or weights.

24. The in-ear device of claim 23, wherein the processor is further configured to execute processor-executable instructions stored in the non-transitory computer-readable medium configured to cause the processor to:

receive a second audio signal from at least one of the first or second microphones;
determining a second command based on the second audio signal using the speech recognition technique and based on the one or more updated coefficients or weights.

25. The in-ear device of claim 13, further comprising:
determining a magnitude of the audio signal,
responsive to determining the magnitude exceeds a threshold, generating a noise-cancellation signal based on the audio signal; and
outputting the noise-cancellation signal to a speaker of the in-ear device, the speaker oriented down the wearer's ear canal towards the wearer's eardrum.

26. The in-ear device of claim 13, wherein the processor is further configured to execute processor-executable instructions stored in the non-transitory computer-readable medium configured to cause the processor to provide hearing assistance or protection, using a speaker disposed in the housing, based on the audio signal.

27. An in-ear device comprising:
housing means for inserting into a wearer's ear canal;
means for engaging with the wearer's ear canal to hold the housing means within the wearer's ear canal;
means for receiving audio signals from an audio source;
means for determining a command based on an audio signal;
means for voice recognition to determine an identity of the audio source;
means for authenticating the command based on the identity of the audio source;
means for generating a signal configured to cause a remote electronic device to execute the command;
means for determining context information associated with the in-ear device;
means for determining the remote electronic device based on the command and the context information; and
means for transmitting the signal to the remote electronic device.

28. The in-ear device of claim 27, wherein the housing means has a first end defined to be oriented towards the interior of the wearer's ear canal, and wherein the means for receiving audio signals is disposed within the first end of the housing means.

29. The in-ear device of claim 28 wherein the first end comprises a protrusion oriented to extend into the wearer's ear canal towards an eardrum, and the means for receiving audio signals is disposed within the protrusion.

* * * * *